D. F. CHAMBERS.
METHOD OF MANUFACTURING BALL RETAINERS.
APPLICATION FILED OCT. 15, 1910.
1,040,274.
Patented Oct. 8, 1912.
Fig. 2.
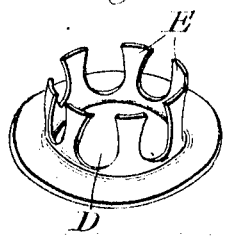
Fig. 2.ª
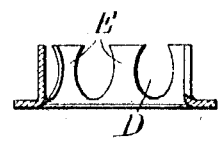
Fig. 3.
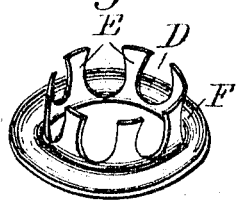
Fig. 3.ª
Fig. 4.
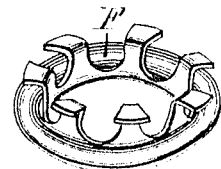
Fig. 4.ª
Witnesses
Donald H. Stewart
E. V. Webster
Inventor
David F. Chambers
By Dowell Dowell
His Attorneys

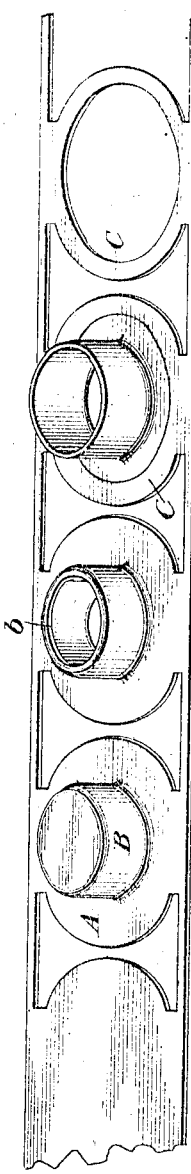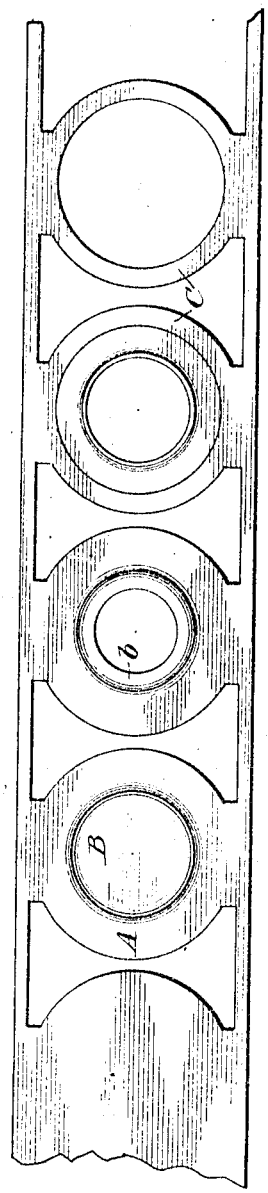

UNITED STATES PATENT OFFICE.

DAVID FRANKLIN CHAMBERS, OF LANCASTER, PENNSYLVANIA, ASSIGNOR TO THE STAR BALL RETAINER COMPANY, OF LANCASTER, PENNSYLVANIA, A CORPORATION OF NEW JERSEY.

METHOD OF MANUFACTURING BALL-RETAINERS.

1,040,274.  Specification of Letters Patent.  Patented Oct. 8, 1912.

Application filed October 15, 1910. Serial No. 587,198.

*To all whom it may concern:*

Be it known that I, DAVID F. CHAMBERS, a citizen of the United States, residing at Lancaster, in the county of Lancaster and State of Pennsylvania, have invented certain new and useful Improvements in Methods of Manufacturing Ball-Retainers, of which the following is a specification.

This invention relates to the manufacture of annular ball retainers for ball bearings, and more particularly to a method of making ball retainers of that type in which a circular series of standards extend from one edge or margin of an annular base and overhang said base, the free ends of the standards being so formed that suitable spaces are provided between the standards for receiving and confining a circular series of balls in separated relation without preventing free rotation of the balls.

In its broader aspects, the object of my invention is to provide a rapid and economical method of forming suitable blanks of annular, angular, or hat-shaped form adapted for use in the manufacture of ball retainers of the character referred to, which are adapted to be struck out of such blanks with suitable ball holding apertures or spaces and angular or other suitably formed parts, for separating and holding a circular series of balls in position to resist both radial pressure and end thrust, without permitting the retainer to contact with the bearing surfaces between which it is placed and without preventing free rotation of the balls in any direction.

A further object is to provide an improved method of manufacturing ball retainers such as are illustrated and described in Patent No. 686,617, granted Henry B. Keiper, Nov. 12, 1901, and particularly the Keiper commercial retainer of the form illustrated and described in the aforesaid Keiper patent as his preferred form, and to reduce the number of steps of the process heretofore employed in the manufacture of such retainers, and the manner of handling and utilizing the material from which they are formed, so as to effect a saving of time, labor and expense in their production.

With the foregoing and other objects in view, the invention will now be hereinafter more particularly described, with reference to the accompanying drawings, which are to be taken as a part of this specification, and then pointed out in the claims at the end of the description.

Figures 1, 1ª and 1ᵇ of said drawings represent a perspective view, a longitudinal sectional elevation, and a plan view, respectively, of a metal and hat-form blanks struck up therefrom in process of manufacture by my improved method showing two partially formed substantially hat-shaped bodies integral with the metallic strip as formed by successive action on the same portion of the strip in the process of producing the complete blank, one of which is shown detached and having the top of its crown removed and the remaining portion drawn out straight in cylindrical form, so as to decrease the thickness of the metal of the crown and lengthen the latter to adapt the severed body for cutting and shaping parts thereof to produce the complete retainer by subsequent treatment or in successive steps of the process. Figs. 2 and 2ª represent a perspective view and a transverse section respectively of the device as produced by subsequent treatment of the severed body in a further step of the process. Figs. 3 and 3ª represent a perspective view and a transverse section, respectively, of the device as produced at another step of the process, and Figs. 4 and 4ª represent a perspective view and a transverse section, respectively, of the device as produced in the final step of the process, this being the finished ball retainer of the Keiper commercial form above mentioned.

In practising my invention, I use a flat strip or plate of metal, preferably steel, of considerable length so as to form or produce from the same strip a considerable number of hat-form blanks, and by means of suitable tools or dies, I first cut a disk-like portion A without severing it from the strip and at the same time draw out the central portion of the disk in the form of the crown of a hat, producing a substantially hat-shaped body B integral with the strip, being joined thereto at each side thereof, as shown, for further treatment as the strip is moved or fed along and the crown portion subjected to the action of another tool or die for cutting out the top of the crown, the metal of which thus drawn out is reduced in thickness so that the standards formed therefrom in succeeding steps of the process will be relatively elastic while the rim or base-ring is relatively stiff or inflexible. When the top is removed there remains an inwardly curved marginal portion, which is denoted by the letter $b$ in the drawings, and the topless crown is then drawn out straight in cylindrical form and severed from the strip, producing a hat-shaped structure having a crown of cylindrical form with open top and a flat rim or annular base of smaller diameter than the disk-like portion out of which it is cut, and after severing the hat-form blank or body, connecting portions of the strip, denoted by the letter C, are left intact therewith, which serve to hold the marginal portions of the strip together and facilitate handling and feeding the strip lengthwise, so as to subject it to the action of suitable tools or dies for producing the desired forms. Such tools or dies may be arranged and operated in various ways for producing the desired blanks, either mechanically or by hand, but I preferably employ a more expeditious method of production, for greater speed and economy, and to this end I may use a mechanically actuated series or group of tools or dies operating simultaneously on different portions of the metal strip and successively on the same portion thereof in such manner that at a single stroke for straightening out the topless crown of a previously partly formed body and severing it from the strip, another previously partly formed body will have the top of its crown removed while another disk-like portion is being cut and drawn out ready to be subjected to the successive action of other forming tools, which at that moment may be operating simultaneously on preceding partly formed portions of the same strip. For instance, the initial hat-like form having been cut and drawn out, the strip of metal is advanced sufficiently to bring a different portion under the action of the same tool, so as to produce another approximately hat-shaped body with a closed top, and at the same time the top of the crown of the first partly formed body is cut or punched out by another suitable tool. The strip being again fed or advanced the required distance, the hat-shaped body with open top and inwardly curved margin is brought under the action of another tool or die for the purpose of straightening and drawing out the metal of the crown and at the same time severing the base portion from the metal strip; and simultaneously with the drawing out and straightening the crown of the partly formed hat-shaped body, a previously partly formed body may have the top of its crown cut out, while another portion of the metal strip is being subjected to the action of another tool for producing another partly formed body to be treated successively in the same manner for producing the desired blank from which the finished ball retainer is made in the succeeding steps of the process. I do not, however, desire to be limited in the application of my invention to mechanical action, successively and simultaneously, or otherwise, as it is obvious that the same method of production may be utilized in various ways, without departing from the spirit and scope of my invention.

The described hat-form blank severed from the strip may now be further treated by cutting and bending portions of the crown, or of the crown and rim, according to the particular form of retainer desired, so as to provide suitable spaces for receiving and confining a circular series of balls in contact with the bearing surfaces between which the retainer is confined, without permitting the retainer to come into contact with such surfaces. I have illustrated in Figs. 2, 2ª to 4, 4ª of the drawings the method of cutting and bending portions of the crown and rim of the hat-shaped blank so as to produce a retainer of the Keiper commercial form, though obviously the form may be varied, still utilizing the same blank.

Figs. 2 and 2ª illustrate the crown portion with cuts of substantially oval form, open at one end, forming a series of standards rising from one edge of the base-ring and widened toward their free ends; the base-ring being flat. In this form the standards may be bent or curved in such manner as to overhang the base-ring and adapt them to confine balls therebetween, but a concave base-ring is stronger and will assist materially in confining the balls and is therefore preferred and used in the Keiper commercial form.

Figs. 3 and 3ª represent the device with the base-ring bent in concave form, and Figs. 4 and 4ª represent the latter device, having the standards bent substantially at right angles to and overhanging the concave base, making the complete retainer.

The entire series of standards may be formed at a single stroke of a suitable tool for cutting the oval-shaped openings, and the base-ring is then bent or pressed into shape by another suitable tool, whereupon the entire series of standards are bent over the concave base, thus finishing the retainer.

Having thus described my invention, what I claim as new and desire to secure by Letters Patent is:

1. The herein described method of forming hat-shaped blanks for use in the manufacture of ball retainers for ball bearings, which consists in first partially cutting from a flat metal strip or plate a disk-like portion and simultaneously drawing out the central portion of the disk so as to form a substantially hat-shaped body having a crown of reduced thickness of metal and a rim integral with the strip, then removing the top of said crown, then drawing out and straightening the topless crown, and then severing its rim from the strip.

2. The herein described method of forming blanks for use in the manufacture of ball retainers for ball bearings, which consists in first cutting without severing from a strip of metal a disk-like portion and simultaneously drawing out the central portion of the disk so as to form a substantially hat-shaped body integral with the strip, then removing the top of the crown of said hat-shaped body, and then drawing out and straightening the topless crown of said partly formed body, and then severing it from the strip.

3. The herein described method of manufacturing ball retainers for ball bearings, which consists in partially cutting from a flat metal strip or plate a disk-like portion and drawing out the central portion of the disk so as to produce a substantially hat-shaped body having a crown of reduced thickness and a partially formed rim joined to the strip, then cutting out the top of the crown, then drawing out the remaining portion of the crown straight in cylindrical form and severing it from the strip with a rim of smaller diameter than the previously partly formed rim, and finally cutting and bending portions of the severed body so as to adapt the device to hold a circular series of balls in separated relation without preventing free rotation of the balls.

4. The herein described method of manufacturing ball retainers for ball bearings which consists in partially cutting from a flat metal strip or plate a disk-like portion and drawing out the central portion of the disk so as to produce a substantially hat-shaped body having a crown of reduced thickness, and a partially formed rim joined to the strip, then cutting out the top of the crown, then drawing out the remaining portion of the crown straight in cylindrical form and severing it from the strip with a rim of smaller diameter than the previously partly formed rim, and finally cutting and bending the crown of the severed body so as to form a series of standards extending from the inner edge of and overhanging a circular base and widened toward their free ends.

5. The herein described method of manufacturing ball retainers for ball bearings which consists in partially cutting from a flat metal strip or plate a disk-like portion and drawing out the central portion of the disk so as to produce a substantially hat-shaped body having a crown of reduced thickness and a partially formed rim joined to the strip, then cutting out the top of the crown, then drawing out the remaining portion of the crown straight in cylindrical form and severing it from the strip with a rim of smaller diameter than the previously partly formed rim, and finally cutting and bending the crown and rim of the severed body so as to form a series of standards extending from the inner edge of and overhanging a circular concave base and widened toward their free ends.

6. The herein described method of making ball retainers for ball bearings, which consists in simultaneously cutting and drawing out a portion of a plate or sheet of metal in such manner as to form a substantially hat-shaped body integral with the strip, then feeding the strip longitudinally, then cutting out the crown of the hat-shaped body and simultaneously forming another similar body, then again feeding the strip, then drawing out the crown portion and severing from the strip the first-formed body and simultaneously forming a third body and cutting out the crown of the second-formed body, and then cutting out and bending the crown and rim of the severed body so as to form a series of standards rising from the inner edge only of the rim and overhanging said rim, thus producing the finished retainer.

7. The improvement in the art of manufacturing ball retainers for ball bearings which consists in partly cutting out a disk from a metal strip and simultaneously drawing out the central portion of the disk to form a substantially hat-shaped body integral with the strip, then cutting out the top of the body concentric with the side leaving a small inturned portion on the top edge of the side of the body, then drawing out said inturned portion and prolonging the side of the body into a cylindrical wall of less thickness than the base of the body, and then severing the body from the strip.

In testimony whereof I affix my signature, in presence of two witnesses.

DAVID FRANKLIN CHAMBERS.

Witnesses:
A. G. MERTZLER,
W. A. FULMER.